(12) United States Patent
Fujino et al.

(10) Patent No.: US 8,780,427 B2
(45) Date of Patent: Jul. 15, 2014

(54) OPTICAL SCANNER AND IMAGE FORMING APPARATUS

(71) Applicant: Brother Kogyo Kabushiki Kaisha, Nagoya-shi, Aichi-ken (JP)

(72) Inventors: Hitoshi Fujino, Tajimi (JP); Yoshifumi Nakamura, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/840,641

(22) Filed: Mar. 15, 2013

(65) Prior Publication Data

US 2013/0250386 A1 Sep. 26, 2013

(30) Foreign Application Priority Data

Mar. 23, 2012 (JP) ................................. 2012-067246

(51) Int. Cl.
*G02B 26/08* (2006.01)

(52) U.S. Cl.
USPC .................. 359/196.1; 359/204.5; 359/205.1; 359/216.1; 359/563

(58) Field of Classification Search
USPC ............ 359/196.1–226.2, 558, 563, 566, 569
See application file for complete search history.

(56) References Cited

U.S. PATENT DOCUMENTS

| 6,191,889 | B1 | 2/2001 | Maruyama |
| 7,428,088 | B2 | 9/2008 | Ishibe |
| 2006/0092492 | A1 | 5/2006 | Ishibe |
| 2011/0228368 | A1* | 9/2011 | Sakai et al. ................. 359/204.1 |

FOREIGN PATENT DOCUMENTS

| JP | H11-337818 A | 12/1999 |
| JP | 2006-154748 A | 6/2006 |

* cited by examiner

*Primary Examiner* — James Phan
(74) *Attorney, Agent, or Firm* — Merchant & Gould P.C.

(57) ABSTRACT

An optical scanner is configured such that an anamorphic condensing lens in an incident optical system has a diffractive lens structure at least in one lens surface thereof, and a length of an optical path increased by the diffractive lens structure φ [rad] is defined by an equation below by a function of height h from an optical axis: $\phi(h)=M(P2 \cdot h^2+P4 \cdot h^4+ \ldots)$, where Pn is a coefficient of an nth-order term of the height h (n is an even number), and M is a diffraction order, that the lens satisfies the following relations: $-216 \leq P2 \leq -49$, $1100 \leq P4 \cdot (hm\,max)^4/(fm \cdot NAm^4) \leq 3800$, and $10 \leq fm \leq 35$, where hmmax [mm] is an effective diameter in the main scanning direction, fm [mm] is a focal length in the main scanning direction, and NAm is a numerical aperture in the main scanning direction, and that a wavefront aberration WFE1 [λrms] in a first wavelength λ1 [nm] satisfies the following relation: $WFE1 \leq 0.01$.

5 Claims, 8 Drawing Sheets

FIG.3

| | Radius of Curvature [mm] (Main scanning direction) | Radius of Curvature [mm] (Sub-scanning direction) | Interelement Spacing [mm] | Refractive Index |
|---|---|---|---|---|
| Light Emitting Point of S/C Laser - Cover Glass | - | - | 0.970 | - |
| Cover Glass | ∞ | ∞ | 0.250 | 1.511 |
| Cover Glass - Anamorphic Condensing Lens | - | - | 17.273 | - |
| Anamorphic Condensing Lens | | | | |
| 1st Surface | ∞ | ∞ | 2.000 | 1.527 |
| 2nd Surface | -17.428 | -10.365 | - | - |
| Anamorphic Condensing Lens - Polygon Mirror Surface | - | - | 42.488 | - |
| Polygon Mirror Surface - Scanning Lens | ∞ | ∞ | 32.681 | - |
| Scanning Lens | | | | |
| 1st Surface | 67.257 | -12.543 | 13.000 | 1.527 |
| 2nd Surface | 152.979 | -9.618 | - | - |
| Scanning Lens - Photoconductor Drum Surface | - | - | 98.833 | - |

FIG.4

| | fn[mm] | fs[mm] | α[1/K] | λ1[nm] | λ2[nm] | Δλ[nm] | n | Ry[mm] | Rx[mm] |
|---|---|---|---|---|---|---|---|---|---|
| Example 1 | 10.00 | 8.41 | 6.50E-05 | 788 | 633 | 155 | 1.527 | -9.54 | -6.98 |
| Example 2 | 15.00 | 11.61 | 6.50E-05 | 788 | 633 | 155 | 1.527 | -14.44 | -9.28 |
| Example 3 | 18.00 | 13.25 | 6.50E-05 | 788 | 633 | 155 | 1.527 | -17.43 | -10.36 |
| Example 4 | 28.00 | 18.01 | 6.50E-05 | 788 | 633 | 155 | 1.527 | -27.98 | -13.47 |
| Example 5 | 35.00 | 20.63 | 6.50E-05 | 788 | 633 | 155 | 1.527 | -35.80 | -15.06 |
| Example 6 | 10.01 | 8.40 | 9.50E-05 | 788 | 633 | 155 | 1.527 | -8.60 | -6.46 |
| Example 7 | 10.00 | 8.42 | 3.50E-05 | 788 | 633 | 155 | 1.527 | -10.73 | -7.60 |
| Example 8 | 15.00 | 11.63 | 3.50E-05 | 788 | 633 | 155 | 1.527 | -16.25 | -10.00 |
| Example 9 | 15.00 | 11.60 | 9.50E-05 | 788 | 633 | 155 | 1.527 | -12.99 | -8.66 |
| Example 10 | 18.00 | 13.33 | 3.50E-05 | 788 | 633 | 155 | 1.527 | -19.66 | -11.19 |
| Example 11 | 18.00 | 13.29 | 9.50E-05 | 788 | 633 | 155 | 1.527 | -15.70 | -9.79 |
| Example 12 | 28.00 | 18.03 | 3.50E-05 | 788 | 633 | 155 | 1.527 | -31.53 | -14.24 |
| Example 13 | 28.00 | 17.99 | 9.50E-05 | 788 | 633 | 155 | 1.527 | -25.16 | -12.78 |
| Example 14 | 35.00 | 20.65 | 3.50E-05 | 788 | 633 | 155 | 1.527 | -40.34 | -15.80 |
| Example 15 | 35.00 | 20.61 | 9.50E-05 | 788 | 633 | 155 | 1.527 | -32.19 | -14.38 |

FIG.5

| | P2 | P4 | Min | Max | A₄ | B₄ | kx | ky | hmmax [mm] | NAm | hsmax [mm] | NAs | WFE1 [λrms] | WFE2 [λrms] |
|---|---|---|---|---|---|---|---|---|---|---|---|---|---|---|
| Example 1 | -192.3 | 1.166 | -1.87E-02 | 1.17E-02 | -2.95E-05 | 4.82E-05 | -0.996 | 0 | 1.00E+00 | 0.1 | 8.41E-01 | 0.1 | 0.0039 | 0.0056 |
| Example 2 | -126.3 | 0.348 | -1.61E-02 | 1.37E-02 | -3.09E-05 | 7.24E-06 | -1.060 | 0 | 1.50E+00 | 0.1 | 1.16E+00 | 0.1 | 0.0024 | 0.0035 |
| Example 3 | -105.1 | 0.219 | -1.51E-02 | 1.40E-02 | -1.27E-05 | -1.17E-06 | -1.037 | 0 | 1.80E+00 | 0.1 | 1.33E+00 | 0.1 | 0.002 | 0.0033 |
| Example 4 | -69.0 | 0.089 | -1.32E-02 | 1.47E-02 | 1.35E-05 | -8.59E-06 | -0.798 | 0 | 2.80E+00 | 0.1 | 1.80E+00 | 0.1 | 0.0015 | 0.0031 |
| Example 5 | -56.3 | 0.065 | -6.35E-03 | 1.86E-02 | 2.24E-05 | -9.58E-06 | -0.527 | 0 | 3.50E+00 | 0.1 | 2.06E+00 | 0.1 | 0.0015 | 0.0032 |
| Example 6 | -167.5 | 1.131 | -1.79E-02 | 1.36E-02 | 1.46E-04 | -7.95E-05 | -1.038 | 0 | 1.00E+00 | 0.1 | 8.40E-01 | 0.1 | 0.0046 | 0.0063 |
| Example 7 | -216.8 | 1.240 | -1.66E-02 | 1.46E-02 | 4.30E-05 | -1.44E-05 | -0.844 | 0 | 1.00E+00 | 0.1 | 8.42E-01 | 0.1 | 0.0035 | 0.0063 |
| Example 8 | -142.6 | 0.343 | -1.51E-02 | 1.48E-02 | 1.97E-05 | -2.26E-06 | -1.052 | 0 | 1.50E+00 | 0.1 | 1.16E+00 | 0.1 | 0.0022 | 0.0032 |
| Example 9 | -109.9 | 0.362 | -1.60E-02 | 1.47E-02 | 3.98E-05 | -1.17E-05 | -1.031 | 0 | 1.50E+00 | 0.1 | 1.16E+00 | 0.1 | 0.0026 | 0.0042 |
| Example 10 | -118.8 | 0.206 | -1.44E-02 | 1.48E-02 | 9.07E-06 | 1.95E-06 | -1.072 | 0 | 1.80E+00 | 0.1 | 1.33E+00 | 0.1 | 0.0019 | 0.0029 |
| Example 11 | -91.8 | 0.232 | -1.51E-02 | 1.49E-02 | 1.63E-05 | -2.39E-07 | -0.994 | 0 | 1.80E+00 | 0.1 | 1.33E+00 | 0.1 | 0.0021 | 0.0037 |
| Example 12 | -77.5 | 0.079 | -1.30E-02 | 1.50E-02 | -1.23E-05 | 7.45E-06 | -0.847 | 0 | 2.80E+00 | 0.1 | 1.80E+00 | 0.1 | 0.0015 | 0.0029 |
| Example 13 | -60.6 | 0.100 | -1.34E-02 | 1.51E-02 | -1.49E-05 | 9.83E-06 | -0.752 | 0 | 2.80E+00 | 0.1 | 1.80E+00 | 0.1 | 0.0015 | 0.0029 |
| Example 14 | -62.9 | 0.058 | -1.24E-02 | 1.51E-02 | -2.11E-05 | 8.44E-06 | -0.543 | 0 | 3.50E+00 | 0.1 | 2.06E+00 | 0.1 | 0.0015 | 0.003 |
| Example 15 | -49.7 | 0.074 | -1.42E-02 | 1.48E-02 | -2.38E-05 | 1.08E-05 | -0.512 | 0 | 3.50E+00 | 0.1 | 2.06E+00 | 0.1 | 0.0015 | 0.0031 |

FIG.6

| | fm | fs | P4(hmmax)⁴/(fm N Am⁴) Lower Limit | Upper Limit | P4(hsmax)⁴/(fs N As⁴) Lower Limit | Upper Limit | |WFE1−WFE2| |
|---|---|---|---|---|---|---|---|
| Example 1 | 10 | 8.4 | 1168 | 1179 | 693 | 700 | 0.0017 |
| Example 2 | 15 | 11.6 | 1173 | 1219 | 545 | 566 | 0.0011 |
| Example 3 | 18 | 13.3 | 1275 | 1357 | 509 | 542 | 0.0013 |
| Example 4 | 28 | 18.0 | 1950 | 2273 | 519 | 605 | 0.0016 |
| Example 5 | 35 | 20.6 | 2808 | 3607 | 575 | 739 | 0.0017 |
| Example 6 | 10 | 8.4 | 1133 | 1147 | 669 | 677 | 0.0017 |
| Example 7 | 10 | 8.4 | 1241 | 1256 | 740 | 748 | 0.0028 |
| Example 8 | 15 | 11.6 | 1159 | 1208 | 540 | 563 | 0.001 |
| Example 9 | 15 | 11.6 | 1221 | 1271 | 565 | 588 | 0.0016 |
| Example 10 | 18 | 13.3 | 1199 | 1285 | 486 | 522 | 0.001 |
| Example 11 | 18 | 13.3 | 1354 | 1441 | 545 | 580 | 0.0016 |
| Example 12 | 28 | 18.0 | 1737 | 2066 | 463 | 551 | 0.0014 |
| Example 13 | 28 | 18.0 | 2197 | 2530 | 583 | 671 | 0.0014 |
| Example 14 | 35 | 20.6 | 2486 | 3133 | 510 | 643 | 0.0015 |
| Example 15 | 35 | 20.6 | 3165 | 3799 | 646 | 776 | 0.0018 |

OPTICAL SCANNER AND IMAGE FORMING APPARATUS

CROSS-REFERENCE TO RELATED APPLICATION(S)

This application claims priority from Japanese Patent Application No. 2012-067246 filed on Mar. 23, 2012, the disclosure of which is incorporated herein by reference in its entirety.

TECHNICAL FIELD

The present invention relates to an optical scanner and an image forming apparatus using the optical scanner.

BACKGROUND ART

In an optical scanner used for an electrophotographic image forming apparatus, a light beam emitted from a light source is converted into a dotted image and focused on a target surface to be scanned, such as a peripheral surface of a photoconductor drum. The light beam is caused to rapidly sweep the peripheral surface of the photoconductor drum in an axial direction (main scanning direction) thereof. The optical scanner includes a light deflector for deflecting the light beam in the main scanning direction. The optical scanner further includes an incident optical system located upstream of the light deflector, and a scanning optical system located downstream of the light deflector. The incident optical system is configured to converge the light beam in the sub-scanning direction to bring the same to a focus in the proximity of the light deflector while rendering the light beam slightly convergent in the main scanning direction. Meanwhile, the scanning optical system focuses the light beam deflected by the light deflector on the target surface to form a dotted image.

To convert the light beam as described above, the incident optical system of the optical scanner uses an anamorphic condensing lens which has different powers (refractive powers) with respect to a main scanning direction and a sub-scanning direction. Further, in this anamorphic condensing lens, the wavefront aberration is corrected with respect to change in wavelength of a light beam on the order of 790 nm, at which a photoconductor drum shows good sensitivity. In this technique, since the magnitude of the wavelength change is small, it is not necessary to consider change in spherical aberration.

To evaluate transmission wavefront of an anamorphic condensing lens, an interferometer operating with a light source for emitting a light beam whose wavelength is on the order of 790 nm is conventionally used.

SUMMARY OF THE INVENTION

However, it is difficult to obtain an interferometer with a light source for emitting a light beam of which the wavelength is on the order of 790 nm or a highly accurate interferometer for this wavelength is not commercially available. In contrast, an interferometer with a He—Ne laser used as a light source for emitting a laser beam having a wavelength of 633 nm is highly accurate and readily available in the market. For this reason, it is desirable to provide an incident optical system which can offer good performance at an actually used wavelength, even if the incident optical system is configured with an anamorphic condensing lens evaluated with a different wavelength.

In this regard, if a fourth- or higher-order term of the phase function of aspheric term and diffractive optical surface is introduced in an equation for a lens surface structure of the anamorphic condensing lens, a change in spherical aberration derived from the fourth- or higher-order term will occur due to the difference between the wavelength on the order of 790 nm and the wavelength of 633 nm. Therefore, it is necessary to design the anamorphic condensing lens so as to suppress the spherical aberration.

The present invention has been made in consideration of the above background, and the purpose of the invention is to provide an optical scanner and an image forming apparatus with the optical scanner, which can offer good performance at an actually used wavelength, even if an evaluation is made thereon using a wavelength different from the actually used wavelength.

According to one aspect of the present invention, there is provided an optical scanner comprising: a light source configured to emit a light beam: a light deflector configured to deflect the light beam from the light source in a main scanning direction: an incident optical system disposed between the light source and the light deflector and configured to converge the light beam from the light source into a linear image elongated in the main scanning direction and to bring the same to a focus on or in proximity to a deflecting surface of the light deflector; and a scanning lens configured to focus the light beam deflected by the light deflector on a target surface to form a dotted image. In this optical scanner, the incident optical system includes an anamorphic condensing lens which has different powers with respect to the main scanning direction and a sub-scanning direction. The anamorphic condensing lens has a diffractive lens structure at least in one lens surface thereof, and a length of an optical path increased by the diffractive lens structure $\phi$ [rad] is defined by an equation below by a function of a height h from an optical axis:

$$\phi(h) = M(P2 \cdot h^2 + P4 \cdot h^4 + \ldots)$$

where Pn is a coefficient of an nth-order term of the height h (n is an even number), and M is a diffraction order, and the anamorphic condensing lens satisfies the following relations:

$$-216 \leq P2 \leq -49$$

$$1110 \leq P4 \cdot (hm\max)^4 / (fm \cdot NAm^4) \leq 3800$$

$$10 \leq fm \leq 35$$

where hmmax [mm] is an effective diameter in the main scanning direction, fm [mm] is a focal length in the main scanning direction, and NAm is a numerical aperture in the main scanning direction. Further, the anamorphic condensing lens is configured such that a wavefront to aberration WFE1 [λrms] in a first wavelength λ1 [nm] satisfies the following relation:

$$WFE1 \leq 0.01.$$

According to another aspect of the present invention, there is provided an image forming apparatus comprising the aforementioned optical scanner.

BRIEF DESCRIPTION OF THE DRAWINGS

To better understand the claimed invention, and to show how the same may be carried into effect, reference will now be made, by way of example only, to the accompanying drawings, in which:

FIG. 3 shows properties of an optical system according to one exemplary embodiment;

FIG. 4 shows properties of optical systems according to various examples;

FIG. 5 shows calculation results of P2, P4 for the various examples;

FIG. 6 shows calculation results for the various examples;

DESCRIPTION OF EMBODIMENTS

With reference to the accompanying drawings, an image forming apparatus and an optical scanner according to one exemplary embodiment of the present invention will be described.

General Arrangement of Laser Printer

Figure 1:
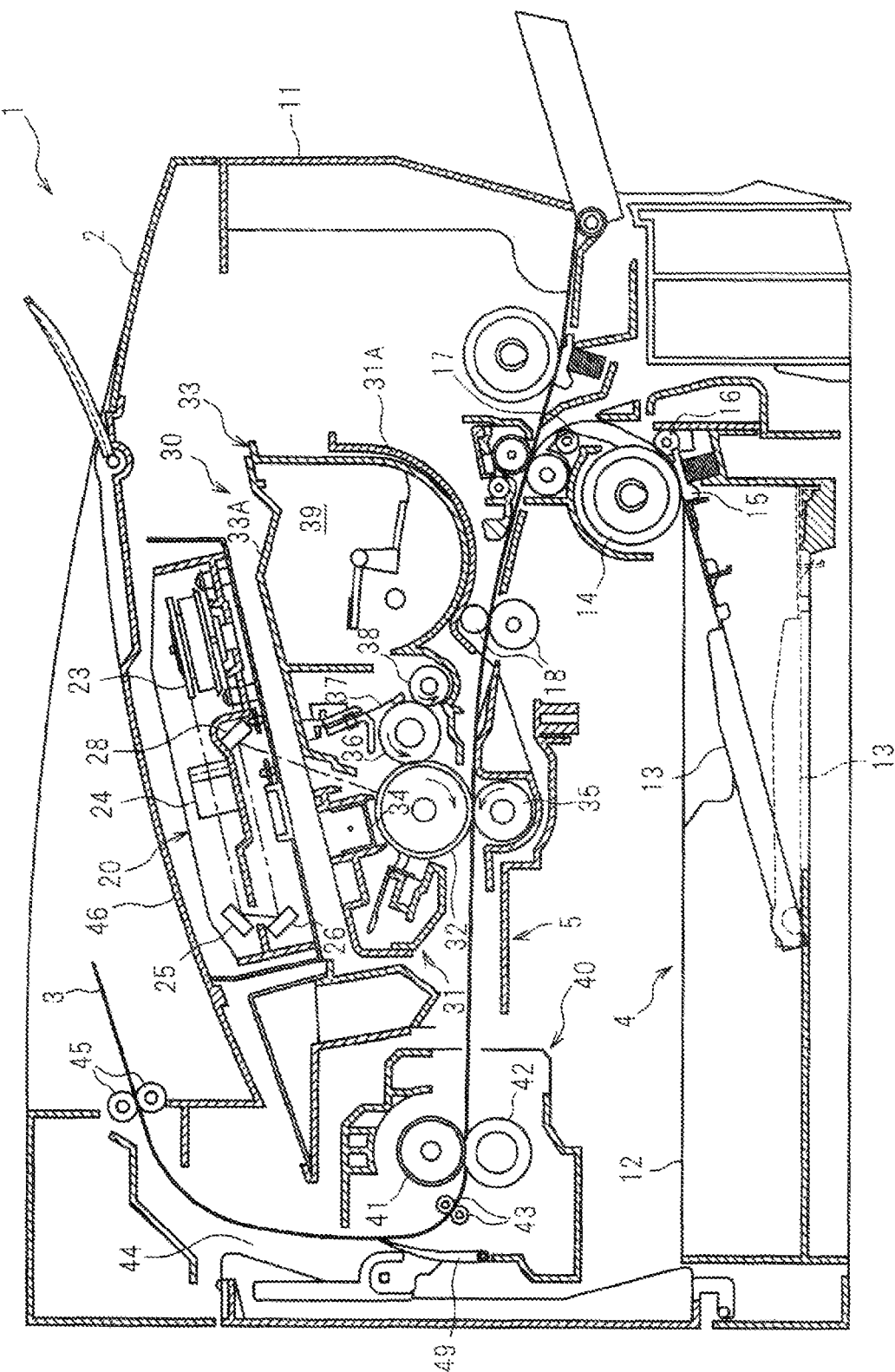
FIG. 1 is a sectional view of an image forming apparatus according to one exemplary embodiment of the present invention.

As seen in FIG. 1, a laser printer 1 as an example of an image forming apparatus includes a main body casing 2, and several components housed within the main body casing 2 which principally includes a sheet feeder unit 4 for feeding a sheet of paper (hereinafter simply referred to as a "sheet" 3), and an image forming unit 5 for forming an image on a sheet 3 fed from the sheet feeder unit 4.

In the following description, the right-hand side of FIG. 1 corresponds to the "front" side of the laser printer 1, and left-hand side of FIG. 1 corresponds to the "rear" side of the laser printer 1.

A front cover 11 is pivotably provided at a front side of the main body casing 2, and a process cartridge 30 to be described later is installable in and removable from the main body casing 2 through an opening formed when the front cover 11 is swung open.

Structure of Sheet Feeder Unit

The sheet feeder unit 4 includes a sheet feed tray 12 detachably installed in a lower space within the main body casing 2, and a sheet pressure plate 13 provided inside the sheet feed tray 12. Further, the sheet feeder unit 4 includes a sheet feed roller 14 and a sheet feed pad 15, which are provided above one end portion of the sheet feed tray 12, sheet dust removing rollers 16, 17 provided downstream from the sheet feed roller 14 in a sheet conveyance direction along which a sheet 3 is conveyed, and a registration roller 18 provided downstream from the sheet dust removing rollers 16, 17 in the sheet conveyance direction.

In this sheet feeder unit 4 configured as described above, a stack of sheets 3 stored in the sheet feed tray 12 is urged upward by the sheet pressure plate 13 toward the sheet feed roller 14, and the sheet feed roller 14 and the sheet feed pad 15 feed out a sheet 3 on one-by-one basis. The sheet 3 is supplied to the image forming unit 5 after passing through the various rollers 16-18.

Structure of Image Forming Unit

The image forming unit 5 includes a scanner 20 as an example of an optical scanner, a process cartridge 30, a fixing device 40, and other components.

Structure of Scanner

The scanner 20 is provided at an upper portion inside the main body casing 2. The scanner 20 is configured to rapidly sweep the surface of a photoconductor drum 32 in the process cartridge 30 with a laser beam emitted in an on/off fashion in response to an input image data. Detailed structure of the scanner 20 will be described later.

Structure of Process Cartridge

The process cartridge 30 is disposed below the scanner 20 and configured to be detachably installable in the main body casing 2. The process cartridge 30 includes a photoconductor cartridge 31 and a development cartridge 33 as an example of a development device.

Structure of Development cartridge

The development cartridge 33 is detachably mounted to a photoconductor frame 31A having a hollow structure and constituting an outer frame of the photoconductor cartridge 31. The development cartridge 33 includes a development roller 36, a doctor blade 37, a supply roller 38, and a toner hopper 39. The development roller 36 and the supply roller 38 are rotatably supported in a development frame 33A having a hollow structure and constituting an outer frame of the development cartridge 33. When the supply roller 38 rotates in a direction shown by the arrow (counterclockwise direction), toner in the toner hopper 39, which is an example of developer, is supplied to the development roller 36 during which the toner is positively charged by triboelectrification between the supply roller 38 and the development roller 36. The toner supplied on the surface of the development roller 36 goes through between the doctor blade 37 and the development roller 36 by the rotation of the development roller 36 in a direction shown by the arrow (counterclockwise direction), so that a thin layer of toner having a predetermined thickness is carried on the development roller 36.

Structure of Photoconductor Cartridge

The photoconductor cartridge 31 mainly includes a photoconductor drum 32, a scorotron charger 34, and a transfer roller 35. The photoconductor drum 32 is supported in the photoconductor frame 31A so as to be rotatable in a direction shown by the arrow (clockwise direction). The photoconductor drum 32 has a drum main body connected to the earth, and the surface of the photoconductor drum 32 is formed by a positively chargeable photosensitive layer.

The scorotron charger 34 is spaced apart by a predetermined distance from the photoconductor drum 32 and is disposed at a position opposite to and above the photoconductor drum 32. The scorotron charger 34 is a positively chargeable scorotron-type charger including a charging wire, for example, made of tungsten to generate corona discharge. The scorotron charger 34 is configured to positively and uniformly charge the surface of the photoconductor drum 32.

The transfer roller 35 is in contact with the photoconductor drum 32 and is disposed at a position opposite to and under the photoconductor drum 32. The transfer roller 35 is supported in the photoconductor frame 31A so as to be rotatable in a direction shown by the arrow (counterclockwise direction). The transfer roller 35 includes a roller shaft, which is made of metal and covered with a conductive rubber material. A transfer bias is applied to the transfer roller 35 under a constant current control during the transfer of toner.

The surface of the photoconductor drum 32 is positively and uniformly charged by the scorotron charger 34, and thereafter exposed to a rapidly sweeping laser beam emitted from the scanner 20. As a result, the electric potential of the exposed area lowers so that an electrostatic latent image associated with image data is formed on the surface of the photoconductor drum 32. Thereafter, when the toner carried on the development roller 36 contacts the photoconductor drum 32 by the rotation of the development roller 36, the toner is supplied to the electrostatic latent image formed on the surface of the photoconductor drum 32. Accordingly, the toner is selectively carried on the surface of the photoconductor drum 32, so that the electrostatic latent image becomes a visible image and hence a toner image is formed by this reversal process.

Thereafter, the photoconductor drum 32 and the transfer roller 35 are driven to rotate to convey a sheet 3 while nipping the sheet 3. When the sheet 3 passes through between the photoconductor drum 32 and the transfer roller 35, the toner image carried on the surface of the photoconductor drum 32 is transferred onto the sheet 3.

Structure of Fixing Device

The fixing device 40 is located downstream of the process cartridge 30 in the sheet conveyance direction. The fixing device 40 includes a heating roller 41, a pressure roller 42 disposed opposite to the heating roller 41 and configured to convey a sheet 3 while the sheet 3 is nipped between the heating roller 41 and the pressure roller 42, and a pair of conveyance rollers 43 provided downstream from the heating roller 41 and the pressure roller 42. In this fixing device 40 configured as described above, the toner transferred onto the sheet 3 is thermally fixed while the sheet 3 passes through between the heating roller 41 and the pressure roller 42, and thereafter the sheet 3 is conveyed to a sheet ejection path 44 by the conveyance rollers 43 and a flapper 49. The sheet 3 conveyed to the sheet ejection path 44 is then ejected by sheet ejection rollers 45 onto a sheet output tray 46.

Detailed Structure of Scanner

Figure 2:
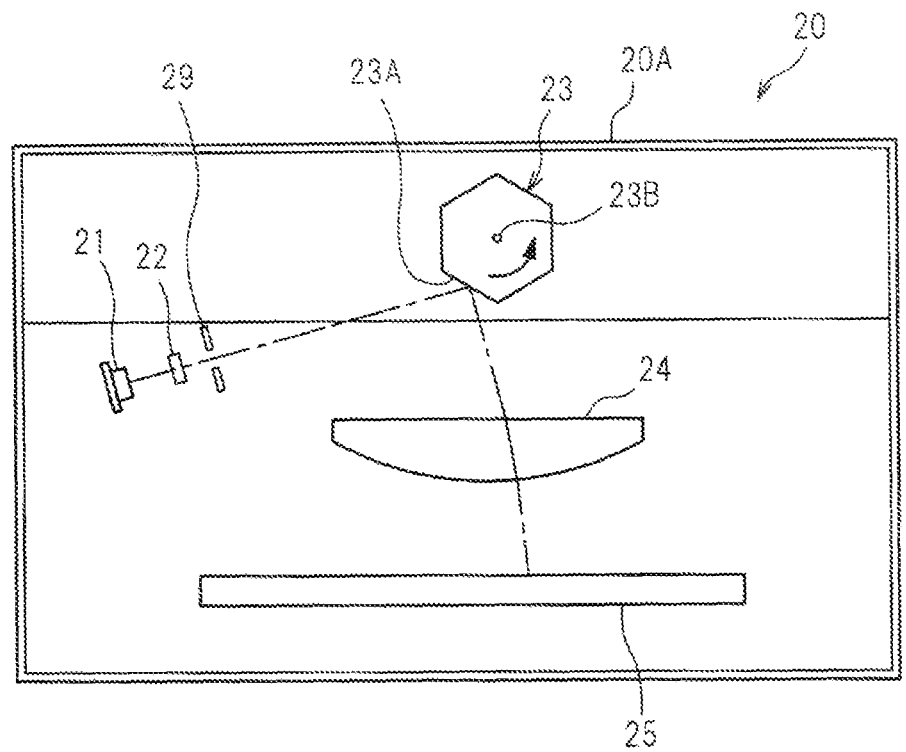
FIG. 2 is a top view of an optical scanner.

As seen in FIGS. 1 and 2, the scanner 20 includes a semiconductor laser 21 as an example of a light source, an anamorphic condensing lens 22 which constitutes an incident optical system, a polygon mirror 23 as an example of a light deflector, a scanning lens 24, reflecting mirrors 25, 26, 28, and an aperture stop 29. These elements are supported by the main body casing 20A. As shown by alternate long and short dash lines, a laser beam emitted from the semiconductor laser 21 is reflected by or passes through the anamorphic condensing lens 22, the aperture stop 29, the polygon mirror 23, the scanning lens 24, and the reflecting mirrors 25, 26, 28 in this order. Thereafter, the surface of the photoconductor drum 32 is irradiated with the laser beam.

The semiconductor laser 21 is configured to emit a slightly divergent laser beam. Under the control of a controller (not shown), a light emitting element of the semiconductor laser 21 emits a laser beam in an on/off fashion associated with an image to be formed on the surface of the photoconductor drum 32.

The anamorphic condensing lens 22 is provided between the semiconductor laser 21 and the polygon mirror 23. Because of different powers with respect to the main scanning direction and the sub-scanning direction, the anamorphic condensing lens 22 converges the light beam emitted from the semiconductor laser 21 into a linear image elongated in the main scanning direction and to bring the same to a focus on or in proximity to a mirror surface (deflecting surface) 23A of the polygon mirror 23. It is noted that the main scanning direction refers to a direction along which the laser beam deflected by the polygon mirror 23 travels, and the sub-scanning direction refers to a direction orthogonal to the main scanning direction and the travelling direction of the laser beam.

The anamorphic condensing lens 22 has a diffractive lens structure in at least one lens surface thereof. For example, the anamorphic condensing lens 22 is configured such that one of the surfaces thereof (e.g. light incident side) is a diffraction surface and the other (e.g. light emission side) is a refraction surface. To save the manufacturing cost, the anamorphic condensing lens 22 is preferably made from a single plastic lens. However, the incident optical system according to the present invention is not limited to one having a single plastic lens, and may employ a glass lens. Further, as long as the incident optical system has at least one refraction surface and at least one diffraction surface, the number of lenses may be optionally determined.

The diffractive lens structure (first surface) of the anamorphic condensing lens 22 is configured, if a base surface is supposed to be flat, such that a length of an optical path increased by the diffractive lens structure $\phi$ [rad] is defined by the following equation using a function of a height h from an optical axis:

$$\phi(h) = M(P2 \cdot h^2 + P4 \cdot h^4 + \dots) \quad (1)$$

where Pn is a coefficient of an nth-order term of the height h (n is an even number), and M is a diffraction order.

According to this embodiment, the diffraction order M is set to 1. Since the 4th order coefficient P4 in the phase function of the above equation (1) affects a change in spherical aberration when a change in wavelength of the light beam occurs, the coefficient P4 is adjusted in this embodiment to suppress a change in wavefront aberration derived from a difference in the wavelength.

To be more specific, the anamorphic condensing lens 22 satisfies the following relations:

$$-216 \le P2 \le -49 \quad (2)$$

$$1100 \le P4 \cdot (hm\max)^4/(fm \cdot NAm^4) \le 3800 \quad (3)$$

$$10 \le fm \le 35 \quad (4)$$

where hmmax [mm] is an effective diameter in the main scanning direction, fm [mm] is a focal length in the main scanning direction, and NAm is a numerical aperture in the main scanning direction.

And further, the anamorphic condensing lens 22 is configured such that a wavefront aberration WFE1 [λrms] in a first wavelength λ1 [nm] satisfies the following relation:

$$WFE1 \le 0.01 \quad (5).$$

The first wavelength in this embodiment corresponds to the wavelength of the scanner 20 (i.e., wavelength of the light beam emitted from the semiconductor laser 21), which is, for example, on the order of 790 nm.

Furthermore, it is preferable that the anamorphic condensing lens 22 satisfies the following relations:

$$380 \le P4 \cdot (hs\max)^4/(fs \cdot NAs^4) \le 780 \quad (6)$$

$$8 \le fs \le 21 \quad (7)$$

where hsmax [mm] is an effective diameter in the sub-scanning direction, fs [mm] is a focal length in the sub-scanning direction, and NAs is a numerical aperture in the sub-scanning direction.

It is further preferable that the anamorphic condensing lens 22 is configured such that a wavefront aberration WFE2 [λrms] in a second wavelength λ2 [nm] satisfies the following relation:

$$|WFE1 - WFE2| \le 0.005 \quad (8).$$

The second wavelength λ2 in this embodiment corresponds to the wavelength used for evaluation (inspection) of the anamorphic condensing lens 22, which is, for example, on the order of 633 nm; highly accurate interferometers using this wavelength are relatively easily available in the market.

As an example, the refraction surface (second surface) of the anamorphic condensing lens 22 is a biconic surface which is defined by the following equation (9):

$$z = \frac{c_x x^2 + c_y y^2}{1 + \sqrt{1 - (1+k_x)c_x^2 x^2 - (1+k_y)c_y^2 y^2}} + \sum_{i=1}^{16} A_i x^i + \sum_{i=1}^{16} B_i y^i \quad (9)$$

$$c_x = \frac{1}{R_x}, \, c_y = \frac{1}{R_y}.$$

The aperture stop 29 is provided at the light incident side of the anamorphic condensing lens 22. The aperture stop 29 is configured to determine in the sub-scanning direction the size of the light beam having passed through the anamorphic condensing lens 22.

The polygon mirror 23 has a plurality of mirror surfaces 23A disposed equidistantly from an axis of rotation 23B of the polygon mirror 23; the polygon mirror 23 shown in FIG. 2 has six mirror surfaces 23A. The polygon mirror 23 spins at a constant rotational speed around the axis of rotation 23B and reflects and deflects the light beam having passed through the aperture stop 29 in the main scanning direction.

The scanning lens 24 is configured to convert the light beam having reflected and thus deflected by the polygon mirror 23 into a dotted image and focuse the same on the surface of the photoconductor drum 32. The scanning lens 24 has f-theta characteristics such that the light beam deflected at a constant angular velocity by the polygon mirror 23 is converted into a light beam that scans the surface of the photoconductor drum 32 at a constant linear velocity.

FIG. 3 shows properties of the optical system in which the scanner 20 according to the embodiment as described above.

With the configurations of the scanner 20 and the laser printer 1 configured as described above, which in particular satisfy the conditions defined by the above equations (2) to (5), a wavefront aberration WFE1 is suppressed considerably in the first wavelength λ1 and a wavefront aberration WFE2 with respect to the main scanning direction is also suppressed considerably in the second wavelength λ2 that is different from the first wavelength λ1, as will be described in examples to be described later. Accordingly, the scanner 20 and the laser printer 1 can offer good performance at an actually used wavelength, even if they are configured based on an evaluation made with a wavelength that is different from the actually used wavelength. For this reason, if an interferometer with a light source using a He—Ne laser is used for an evaluation on the scanner 20 and the laser printer 1 with the wavelength on the order of 633 nm, it is possible to simulate and evaluate the performance at the wavelength on the order of 790 nm.

Further, the scanner 20 and the laser printer 1, which satisfy the conditions defined by the above equations (6) and (7), can considerably suppress a wavefront aberration with respect to the sub-scanning direction as well.

Further, the scanner 20 and the laser printer 1, which satisfy the conditions defined by the above equation (8), can offer good performance both in the first wavelength λ1 and in the second wavelength λ2, so that an evaluation on the optical system with the second wavelength λ2 can sufficiently ensure the performance in the first wavelength λ1.

Although the present invention has been described with reference to the above exemplary embodiment, the present invention is not limited to this specific embodiment. It is to be understood that various modifications and changes may be made to any of the specific configurations without departing from the scope of the appended claims.

In the above embodiment, the anamorphic condensing lens 22 is configured such that the light incident side thereof is a diffraction surface and the light emission side thereof is a refraction surface. However, the anamorphic condensing lens 22 may be configured such that the light incident side thereof is a refraction surface and the light emission side thereof is a diffraction surface.

Further, the above embodiment describes a monochrome laser printer 1 as an example of an image forming apparatus. However, the present invention is not limited to this specific type laser printer, and may be applicable to other image forming apparatuses such as a color laser printer, a copying machine and a multifunction peripheral.

EXAMPLE

To considerably suppress wavefront aberrations of an anamorphic condensing lens 22 in two wavelengths, the inventors of the present invention attempted to perform optimization calculations for optical systems according to several embodiments to specify the range of the coefficient P4 used in the above equation (1).

To be more specific, in a typical optical system such as shown in FIG. 3, the coefficient of linear expansion α (see FIG. 4) and the distance between the semiconductor laser 21 and the anamorphic condensing lens 22 were varied to change the focal length fm in the main scanning direction and the focal length fs in the sub-scanning direction. The coefficient of linear expansion a indicates a coefficient of linear expansion for a supporting member which supports the semiconductor laser 21 and the anamorphic condensing lens 22 (i.e., part determining the spacing between these elements (inter-element spacing)). Herein, the ratio of wavelength change in wavelength of the semiconductor laser versus temperature is set to 0.25 [nm/° C.], and Ry and P2 are set so as to minimize a focal plane shift (the amount of shift in in-focus position from the target surface to be scanned) with respect to the main scanning direction when a temperature change occurs in the range of −5 to 55[° C.].

Further, by using the parameters shown in FIGS. 4 and 5 and optimizing (minimizing) the wavefront aberration WFE1, values of P2, P4, $A_4$, and $B_4$ were obtained. Further, by increasing and decreasing the value of P4, shifts in the value of P4 (minimum value and maximum value) at the value of WFE1=0.01 were obtained. The results were shown in FIG. 5.

With the use of the results shown in FIG. 5, values of P4·(hm max)$^4$/(fm·NAm$^4$) and values of P4·(hs max)$^4$/(fs·NAs$^4$) were obtained from the optimum coefficients P4, upper limit values of P4·(hm max)$^4$/(fm·NAm$^4$) and upper limit values of P4·(hm max)$^4$/(fs·NAs$^4$) were obtained from the upper limit values of the coefficients P4, and lower limit values of P4·(hm max)$^4$/(fm·NAm$^4$) and lower limit values of P4·(hs max)$^4$/(fs·NAs$^4$) were obtained from the lower limit values of the coefficients P4. These values were shown in FIG. 6. Further, these values were shown in graphs of FIGS. 7 and 8. It is noted that closed diamonds in FIGS. 7 and 8 denote the optimum values.

Figure 7:
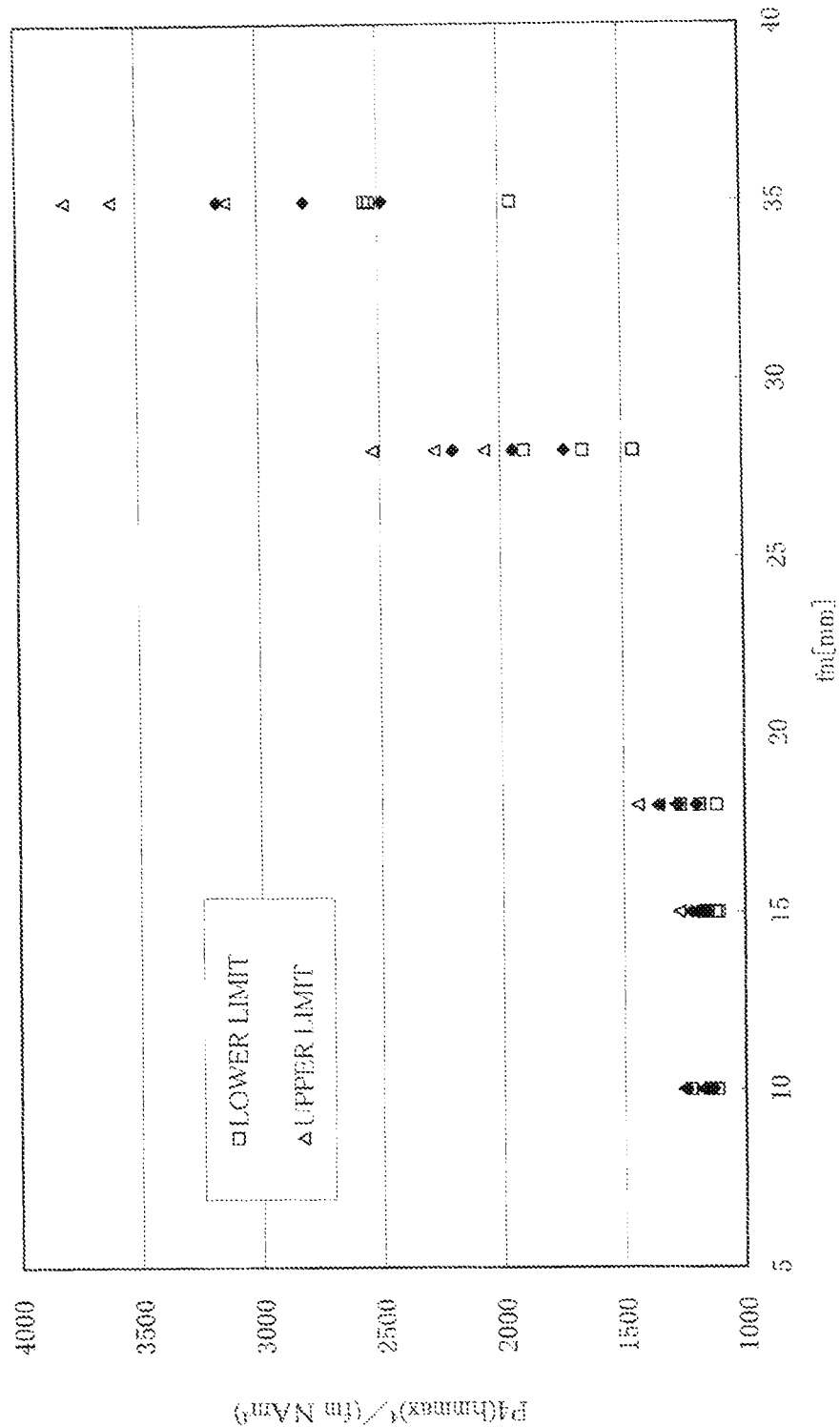
FIG. 7 is a graph obtained by plotting fm and $P4 \cdot (hm\ max)^4/(fm \cdot NAm^4)$ for each of the examples.
Figure 8:
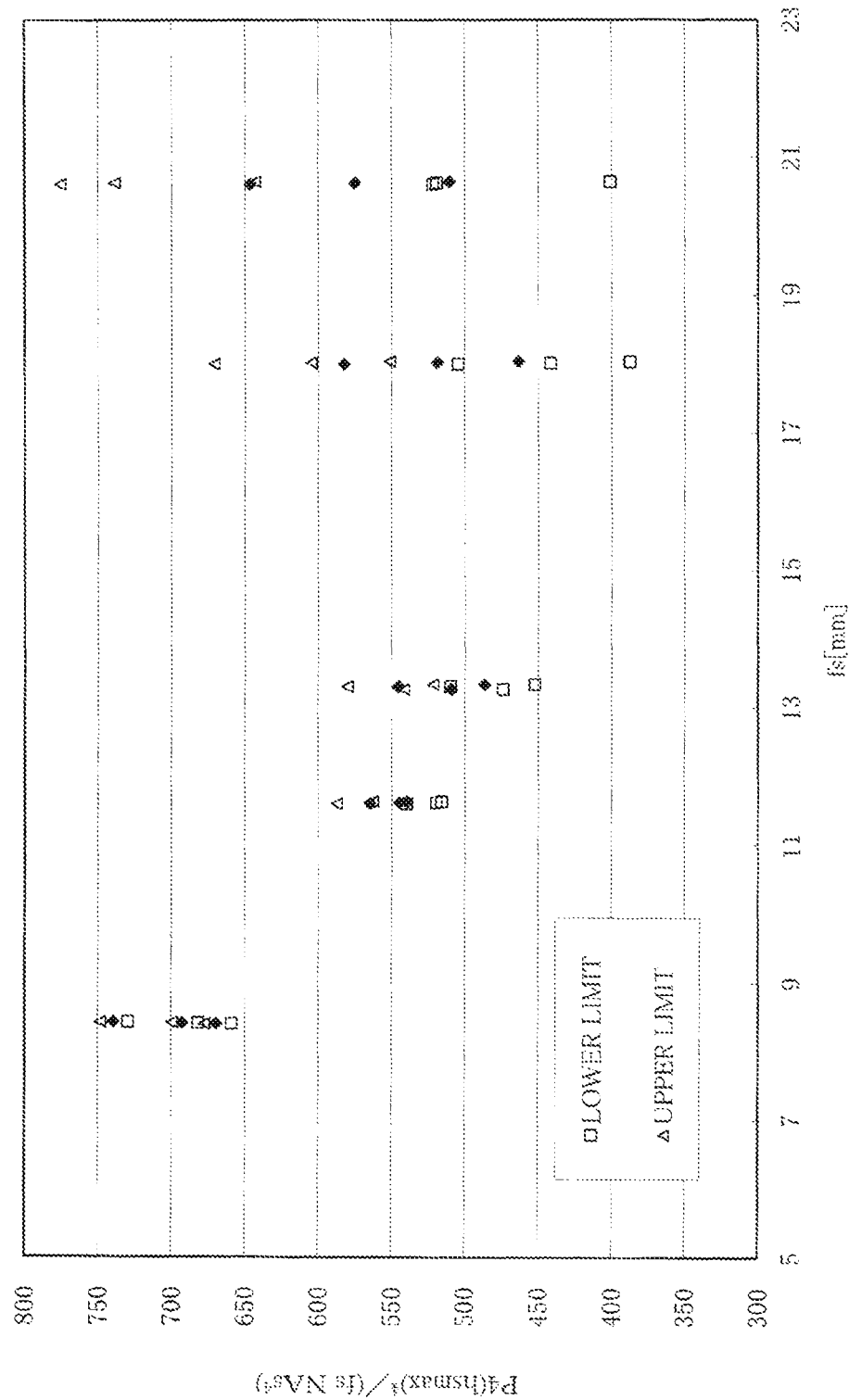
FIG. 8 is a graph obtained by plotting fs and $P4 \cdot (hs\ max)^4/(fs \cdot NAs^4)$ for each of the examples.

The plotted points shown in FIG. 7 are those which could considerably suppress the wavefront aberration WFE1 with respect to the main scanning direction, whereas the plotted points shown in FIG. 8 are those which could considerably suppress the wavefront aberration WFE1 with respect to the sub-scanning direction.

As seen in FIG. 7, it was revealed that WFE1 could be suppressed not more than 0.01 when the focal length fm in the main scanning direction was in the range of 10-35 mm and 1100≤P4·(hm max)$^4$/(fm·NAm$^4$)≤3800 was satisfied.

Further, as seen in FIG. 8, it was revealed that WFE1 could be suppressed not more than 0.01 when the focal length fs in the sub-scanning direction was in the range of 8-21 mm and $380 \leq P4 \cdot (hs\ max)^4/(fs \cdot NAs^4) \leq 780$ was satisfied.

According to the above examples and with reference to the rightmost column of FIG. 6, it was revealed that the difference between the wavefront aberration WFE1 in the first wavelength λ1 and the wavefront aberration WFE2 in the second wavelength λ2 was within the range of 0.001-0.0028, which were smaller than 0.005; the value of 0.005 was much smaller than the reference value of 0.01 by which failure and non-failure of the lenses according to the above examples were determined. In other words, according to the anamorphic condensing lenses in the above examples, if the wavefront aberration WFE2 in the second wavelength λ2 is measured for evaluation of the anamorphic condensing lens, and it is determined that the wavefront aberration WFE2 in the second wavelength λ2 is considerably small, then it can be said that the wavefront aberration WFE1 in the first wavelength λ1 is considerably small (and may be 0.0028 at the highest) and the anamorphic condensing lens offers good performance even in the wavelength λ1. Namely, adjusting the coefficient P4 makes it possible to considerably suppress the wavefront aberration even at a different wavelength (i.e. regardless of the difference in the wavelengths; |λ1−λ2|=145 nm).

In the above embodiments, advantageous effects were demonstrated in the cases where the first wavelength λ1 and the second wavelength λ2 were different by 145 nm. However, since the laser operating at a wavelength on the order of 790 nm operates in the wavelength range up to approximately 810 nm, it is preferable that the difference in wavelength is not more than 180 nm (i.e. |λ1−λ2|=810 nm−633 nm). Further, it is more preferable that the difference is not more than 145 nm.

What is claimed is:

1. An optical scanner comprising:
   a light source configured to emit a light beam;
   a light deflector configured to deflect the light beam from the light source in a main scanning direction;
   an incident optical system disposed between the light source and the light deflector and configured to converge the light beam from the light source into a linear image elongated in the main scanning direction and to bring the same to a focus on or in proximity to a deflecting surface of the light deflector; and
   a scanning lens configured to focus the light beam deflected by the light deflector on a target surface to form a dotted image,
   wherein the incident optical system includes an anamorphic condensing lens which has different powers with respect to the main scanning direction and a sub-scanning direction,
   wherein the anamorphic condensing lens has a diffractive lens structure at least in one lens surface thereof, and a length of an optical path increased by the diffractive lens structure φ [rad] is defined by an equation below by a function of a height h from an optical axis:

$$\phi(h) = M(P2 \cdot h^2 + P4 \cdot h^4 + \ldots)$$

where Pn is a coefficient of an nth-order term of the height h (n is an even number), and M is a diffraction order,
   wherein the anamorphic condensing lens satisfies the following relations:

$$-216 \leq P2 \leq -49$$

$$1110 \leq P4 \cdot (hm\ max)^4/(fm \cdot NAm^4) \leq 3800$$

$$10 \leq fm \leq 35$$

where hmmax [mm] is an effective diameter in the main scanning direction, fm [mm] is a focal length in the main scanning direction, and NAm is a numerical aperture in the main scanning direction, and
   wherein the anamorphic condensing lens is configured such that a wavefront aberration WFE1 [λrms] in a first wavelength λ1 [nm] satisfies the following relation:

$$WFE1 \leq 0.01.$$

2. The optical scanner according to claim 1, wherein the anamorphic condensing lens satisfies the following relations:

$$380 \leq P4 \cdot (hs\ max)^4/(fs \cdot NAs^4) \leq 780$$

$$8 \leq fs \leq 21$$

where hsmax [mm] is an effective diameter in the sub-scanning direction, fs [mm] is a focal length in the sub-scanning direction, and NAs is a numerical aperture in the sub-scanning direction.

3. The optical scanner according to claim 1, wherein the anamorphic condensing lens is configured such that a wavefront aberration WFE2 [λrms] in a second wavelength λ2 [nm] satisfies the following relation:

$$|WFE1 - WFE2| \leq 0.005.$$

4. The optical scanner according to claim 2, wherein the anamorphic condensing lens is configured such that a wavefront aberration WFE2 [λrms] in a second wavelength λ2 [nm] satisfies the following relation:

$$|WFE1 - WFE2| \leq 0.005.$$

5. An image forming apparatus comprising the optical scanner of claim 1.

* * * * *